Patented Oct. 27, 1942

2,299,806

UNITED STATES PATENT OFFICE 2,299,806

PRODUCTION OF ACETONE FROM ETHYL ALCOHOL

Henry Dreyfus, London, and Walter Henry Groombridge, Spondon, near Derby, England, assignors to Celanese Corporation of America, a corporation of Delaware No Drawing. Application December 7, 1940, Serial No. 369,113. In Great Britain December 20, 1939

2 Claims. (Cl. 260—596)

This invention relates to dehydrogenation and especially to the production of lower aliphatic ketones, e. g., acetone by the catalytic dehydrogenation in the vapour phase of mixtures of steam and a lower aliphatic alcohol, e. g., ethyl alcohol, or lower fatty acid aliphatic ester, e. g., methyl acetate.

According to the present invention lower aliphatic ketones are formed by contracting a mixture of steam and the vapour of an alcohol or lower fatty acid aliphatic ester with a catalyst comprising at least one heavy metal oxide, at a temperature between 350° and 500° C., the partial pressure of the alcohol being substantially equal to that of the alcohol in a steam-alcohol-vapour mixture containing 20 to 40% by weight of the alcohol at the same temperature and at atmospheric pressure. The desired partial pressure can be obtained, for instance by working at atmospheric pressure and diluting the alcohol with a large excess of steam or with a mixture of steam and an inert gas. Or the process may be carried out using a mixture relatively rich in alcohol but at a reduced total pressure. The most important application of the invention is in the production of acetone from aqueous ethyl alcohol.

It is an important advantage of the invention that high yields can be obtained for a relatively low expenditure of heat units.

The catalyst preferably comprises a mixture of ferric and zinc oxides made by precipitating the basic carbonates or hydroxides of the two metals from a solution containing a ferric salt and a zinc salt at ordinary or preferably elevated temperatures, for example 60 or 70° C., and heating the precipitate as such or after admixture with a hydraulic cementitious substance, for example Portland cement. It is of advantage to allow the catalyst so produced to age for some time, for example for 7-14 days before use, as this appears to produce a considerable increase in activity.

The production of acetone according to the invention may be carried out by vaporising, in a flash boiler, aqueous alcohol of the desired concentration, for example 25 or 30-35%, and passing the vapours through a tube, which may be of iron, containing the catalyst and maintained at a temperature between 350 and 450° C.

It is of advantage, especially when the time of contact is relatively short, to recycle unconverted alcohol. This may be done by distilling the condensate and scrubbings at a temperature sufficiently high to remove at least part of the acetone present, but at a temperature below the boiling point of the alcohol, adding fresh alcohol to the liquor from the base of the still to bring up the strength to the original 25-35%, and returning the resulting solution to the boiler.

In an alternative method using an inert diluent to assist in attaining the desired partial pressure, alcohol of higher concentration, for example 60-70%, may be vaporised in a flash boiler as before, the vapour mixed with several times (for example 2 to 3 or 4 times) its own volume of nitrogen or other inert gas, and the process completed as described above. When using an inert diluent in this way shorter times of contact are, in general, permissible, and higher conversions may be attained. The products of the reaction may, however, be recycled, as described above.

As indicated above, the reaction may, with advantage, be carried out under reduced pressure. In this case, as when an inert diluent is used, aqueous alcohol of relatively high concentration, for example 60-70% by weight, can be employed with consequent saving in steam consumption. With alcohol of the concentration specified, suitable pressures lie between ¼ and ⅕ or ⅙ of an atmosphere.

The catalyst, as indicated above, is preferably prepared by the co-precipitation of the carbonates or hydroxides of calcium and zinc, followed by conversion of the carbonates or hydroxides into the corresponding oxides after a period of ageing. Other catalysts containing in admixture heavy metal oxides, especially oxides of a tervalent metal such as iron, cobalt or manganese and earth oxides, for example, magnesium, calcium, strontium or barium oxide or oxides of metals such as zinc or cadmium may be employed though with less advantage than the preferred catalysts. It will be appreciated that the oxides may be formed in situ in the reaction tube from readily decomposable compounds, e. g., the hydroxides, carbonates, borates or silicates of heavy metals. The catalyst may be formed into granules, or into cakes which are then broken up, or may be spread on suitable supporting material, for example Kieselguhr.

The following examples illustrate the invention:

Example 1

70% aqueous alcohol (the percentage being by weight) is vaporised at the rate of 60 litres per hour in a flash boiler and the vapor is passed together with about 6 times its volume of carbon dioxide, hydrogen or water gas, through a tube of capacity 150 litres filled with a catalyst comprising a mixture of ferric oxide and zinc oxide.

The catalyst contains ferric oxide and zinc oxide, the proportion of $Fe_2O_3:ZnO$ being from 3:2 to 2:1, and is made by precipitating the basic carbonates or hydroxides from an aqueous solution containing a ferric salt and a zinc salt, filtering off the precipitate under vacuum, forming it into cakes, breaking up the cakes into pieces of ¼ to ⅜" mesh, and allowing the composition so formed to age for 7–14 days.

The catalyst so produced is heated to between 350 and 450° C. in an iron tube, in the course of which the carbonates are converted into the corresponding oxides, and the tube is maintained at the temperature specified during the passage of the mixture of alcohol vapour and diluent.

The vapours emerging from the catalyst tube are separated from the diluting gases by condensation followed by scrubbing with water. Acetone, together with a small proportion of acetaldehyde, are recovered by distillation from the condensate and scrubbings from which also unconverted alcohol is recovered and recycled. The scrubbing step may be omitted, the reaction products after separation of the condensation being enriched with fresh quantities of alcohol and recycled.

Example 2

The process is carried out as in Example 1 save that the reaction is effected at a pressure of about 0.2 atmospheres and the vapors obtained by vapourising the aqueous alcohol are fed to the reaction tube without dilution. The reaction products are condensed, the acetone in admixture with a small quantity of acetaldehyde is recovered by distillation from the condensate and the aqueous alcohol is brought to a concentration of about 70% by weight and recycled.

Example 3

The process is carried out as in Examples 1 or 2 save that in the production of the catalyst the precipitated carbonates are mixed with Portland cement before forming, to give a composition containing about 20% by weight of the mixed oxides of iron and zinc.

The catalyst in these examples can be reactivated when necessary by blowing air through the hot reaction tube.

The invention has been described with particular reference to the production of acetone from ethyl alcohol. In a similar way, however, mixtures of other organic compounds with water vapour may be dehydrogenated in the vapour phase. Thus, for example, diethyl ketone can be made from propyl alcohol and steam, and acetone from methyl acetate and steam.

Having described our invention, what we desire to secure by Letters Patent is:

1. Process for the production of acetone, which comprises contacting a mixture of steam and ethyl alcohol vapor with a catalyst consisting essentially of ferric oxide and zinc oxide in a ratio of 3:2 to 2:1 at a temperature between 350° and 500° C., the partial pressure of the alcohol being substantially equal to that of the alcohol in a steam-alcohol-vapor mixture containing 20 to 40% by weight of alcohol at the same temperature and at atmospheric pressure.

2. Process for the production of acetone, which comprises heating at a temperature between 350° and 500° C. a mixture of steam and ethyl alcohol vapor in the presence of a catalyst consisting essentially of ferric oxide and zinc oxide in a ratio of 3:2 to 2:1 and formed by co-precipitation of substances selected from the class consisting of the carbonates and hydroxides of zinc and iron at a temperature up to about 70° C., the partial pressure of the alcohol being substantially equal to that of the alcohol in a steam-alcohol-vapor mixture containing 20 to 40% by weight of alcohol at the temperature of treatment and at atmospheric pressure.

HENRY DREYFUS.
WALTER HENRY GROOMBRIDGE.